(12) United States Patent
Triplett

(10) Patent No.: US 6,421,577 B1
(45) Date of Patent: Jul. 16, 2002

(54) INJECTION MOLD MOUNTED PROCESS CONTROL AND DATA ACQUISITION APPARATUS

(75) Inventor: Timothy Triplett, Thousand Oaks, CA (US)

(73) Assignee: American MSI Corporation, Moorpark, CA (US)

(*) Notice: Subject to any disclaimer, the term of this patent is extended or adjusted under 35 U.S.C. 154(b) by 0 days.

(21) Appl. No.: 09/419,313

(22) Filed: Oct. 15, 1999

Related U.S. Application Data

(63) Continuation-in-part of application No. 08/798,831, filed on Feb. 12, 1997, now Pat. No. 6,000,831.

(51) Int. Cl.$^7$ .............................................. G06F 19/00
(52) U.S. Cl. ....................................... 700/204; 700/200
(58) Field of Search ................................. 700/204, 197, 700/200, 202, 201; 425/135–150, 542–595

(56) References Cited

U.S. PATENT DOCUMENTS

| | | | |
|---|---|---|---|
| 4,745,541 A | * 5/1988 | Vaniglia | 700/12 |
| 4,819,273 A | * 4/1989 | Gordon | 359/144 |
| 4,826,418 A | 5/1989 | Kamiguchi | |
| 4,899,288 A | 2/1990 | Tsutsumie | |
| 5,068,779 A | 11/1991 | Sullivan et al. | 700/56 |
| 5,316,707 A | 5/1994 | Stanciu et al. | |
| 5,422,787 A | * 6/1995 | Gourdine | 361/697 |
| 5,456,870 A | 10/1995 | Bulgrin | |
| 5,491,647 A | * 2/1996 | O'Brien et al. | 701/99 |
| 5,523,640 A | 6/1996 | Sparer et al. | 310/64 |
| 6,000,831 A | * 12/1999 | Triplett | 700/204 |

* cited by examiner

*Primary Examiner*—Leo Picard
*Assistant Examiner*—Chad Rapp
(74) *Attorney, Agent, or Firm*—Koppel, Jacobs, Patrick & Heybl

(57) ABSTRACT

The present invention relates to injection mold hot runner control devices and more particularly to an injection molding control device which eliminates the conventional control cables to improve the quality of feedback signals received by the controller and the safety of the environment in which such systems are used. The present invention utilizes a signal processor to convert analog signals received from the mold temperature sensors into a digital feedback signal in the vicinity of the mold and to transmit such feedback signal to a receiver connected to a controller at a location remote from the mold. The mold controller processes the feedback signal and generates a corresponding control signal. The control signal is transmitted from the remotely located controller to the controlled device, typically the mold heaters. A single controller and a single mold signal processor may be used to be able to control numerous molds by utilizing signals on different lines or frequencies or in other means of signal differentiation known to those skilled in the art. The system of the present invention enables the injection mold user to eliminate the numerous problems, difficulties and repair costs of the prior art as well as enabling the user to gain an improved feedback loop that was not feasible under control systems of the prior art.

15 Claims, 4 Drawing Sheets

INJECTION MOLD MOUNTED PROCESS CONTROL AND DATA ACQUISITION APPARATUS

This application is a continuation in part of U.S. patent application Ser. No. 08/798,831, filed on Feb. 12, 1997, now U.S. Pat. No. 6,000,831, patented Dec. 14, 1999.

BACKGROUND OF THE INVENTION

The present invention relates to injection molding apparatus and procedures and more particularly to a structure and method for enabling and facilitating the transmission of information from injection mold sensors to a control device and in response to the signals from the mold sensors the control device transmits information to the mold without the use of cumbersome and expensive analog hard-wired connections. The present invention also provides increased reliability in the feedback control loop as it enables the user to eliminate numerous junctions which can introduce errors into the control system.

Injection molding is typically done in molds which operate at high temperatures and high pressures within the molds. Typical molds include means-to heat the molds at numerous points within the mold in order to ensure that the material injected into the mold remains in a molten state until the mold cavity is completely filled and that no voids exist within the cavity (i.e. hot runner system) as is known to those skilled in the art. In addition, as is known to those skilled in the art, it can be desirable to heat a mold, prior to injecting material therein, in order to control the rate at which the material cools and hardens in order to effect the material properties of the molded product (e.g. material strength, etc.)

In order to effect such control, it is necessary to provide a closed-loop feedback system between the controlled device (e.g., a mold heater) and the mold sensor (e.g., a mold temperature sensor), through a controller of some sort which can utilize the information from the mold sensor and control the controlled device in accordance with a predetermined set of instructions. Currently, information from injection mold sensors is transmitted to a controller in analog form via a hard-wired connection which utilizes sensor specific wires which are physically connected to the sensors and the control device through a series of connectors. These wires, used with readily available connectors, create sensor feedback cables. Each cable typically requires two or more wires per sensor located in the mold to transfer an analog signal.

The number of cables required to transfer the information as applied to, for example, temperature in thermal analog form, from the mold to the control device, is dependent on the number of sensor devices located in the mold, but often times exceeds 48 wires for a typical commercial mold configuration. For example, if a mold requires 30 sensor devices, 60 analog sensor wires would typically be required. In addition, each of the sensor wires is typically arranged such that there are 7 thermal junction points between the sensor device and the control device for each sensor wire. Accordingly, in an injection mold such as the one described above, there would be 420 connections created between the sensor devices in the identified mold and the control device for that mold.

Closed-loop feedback systems such as those described above with numerous wires and connectors can create various problems known to those skilled in the art, including: 1) problems associated with bad connections and cold solder joints which may feedback faulty or intermittent data; 2) inaccurate feedback due to temperature variations along the path of the analog feedback cable; 3) the effects of electrical noise on low level analog signals over the span of the feedback cable; 4) numerous problems caused by the sheer volume of cables and wires required, including problems as simple as storage of the wires and cables, and people tripping over cables located on the floor of the injection mold area; and 5) other problems known to those skilled in the art. As the number of sensors in a given mold increases, so too does the number of wires and connections in a conventional system. Thus, as the mold becomes more intricate or sophisticated and control of the operation of the mold becomes more critical, the chance for induced error in a conventional control system similarly increases indeed, one practical limitation on the number of temperature sensors which can be effectively employed in injection molding systems results from the limitation on the number of sensor and control wires which a system and system operator can manage.

SUMMARY OF THE INVENTION

The preferred embodiment of the present invention provides for sensor input circuitry to be positioned within a thermally isolated enclosure attached to the mold or positioned in the vicinity of the mold. A signal processor, which in the preferred embodiment of the present invention converts analog sensor signals from the sensors into a digital format is also provided. Sensors may be provided to monitor, set point, actual mold temperature, power output, or any other parameter of interest to the mold operator. In addition, the present invention includes a communicator positioned within the thermally isolated enclosure to transmit information from the various mold sensors, once it has been converted to digital format, to the mold controller and a receiver positioned in or in the proximity of the mold controller to receive said digital information transmitted to the mold controller from the communicator so as to permit the closed-loop control of the molding apparatus. The information may be transmitted by means of digital wire, RF (radio frequency) or IR (infrared).

An advantage of the invention is that, unlike the system of the prior art which required numerous analog connections and the concomitant problems associated therewith, the present invention allows the transmission of signals from the sensor input circuitry to the mold controller to be accomplished by digital means, thereby eliminating numerous analog connections and the associated problems therewith. The present invention also allows for the transmission of control signals from the mold controller or operator interface back to the mold so as to provide for an automatic closed-loop control system. This digital interface eliminates all but one of the analog connections, thereby almost entirely eliminating the possibility of junction induced error.

In addition, because the information is preferably converted to digital form within a thermally isolated enclosure located on the proximity of the mold itself and transmitted in such form to the control device, the possibility of electrical noise effecting an analog control signal is also greatly reduced. Furthermore, many advantages are created through the elimination of the numerous cables required by the prior art, including: 1) reduced replacement costs for the numerous wires; 2) reduction in cable connection errors; 3) energy a and space savings due to the elimination of the need to transport and store the vast number of wires and cables required under the prior art; 4) elimination of the safety hazard created when low level analog signals run next to high power output cables, which may be mistakenly connected to the wrong device and cause damage, fire or electrocution; and 5) elimination of the safety hazard created when numerous wires and cables are run along the floor of the area in which the injection mold is positioned.

An additional feature of an alternate embodiment of this invention is the providing of a quick connect/disconnect apparatus for attaching the enclosure to the mold. A junction box is provided on the mold allows for the quick and easy connection of the thermally isolated enclosure. The enclosure may be removed and the prior standard analog cables attached if for whatever reason the operator wishes to switch back to the prior technology. Also, the easy removal of the enclosure allows for its easy substitution and replacement if needed.

These and other features and advantages of the present invention will become apparent from the following detailed description of a preferred embodiment which, taken in conjunction with the accompanying drawings, illustrates by way of example the principles of the invention.

BRIEF DESCRIPTION OF THE DRAWINGS

The present invention will be described more fully in reference to the accompanying drawings, wherein.

DETAILED DESCRIPTION OF THE PREFERRED EMBODIMENTS

Figure 1:
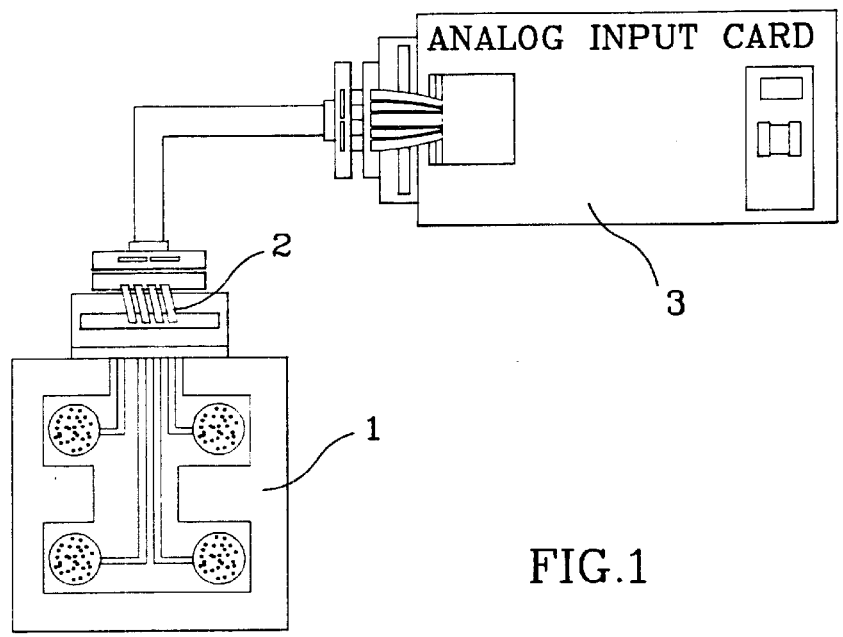
FIG. 1 is an illustrative prospective view of a typical mold and associated control device utilizing a system of the prior art.
Figure 3:
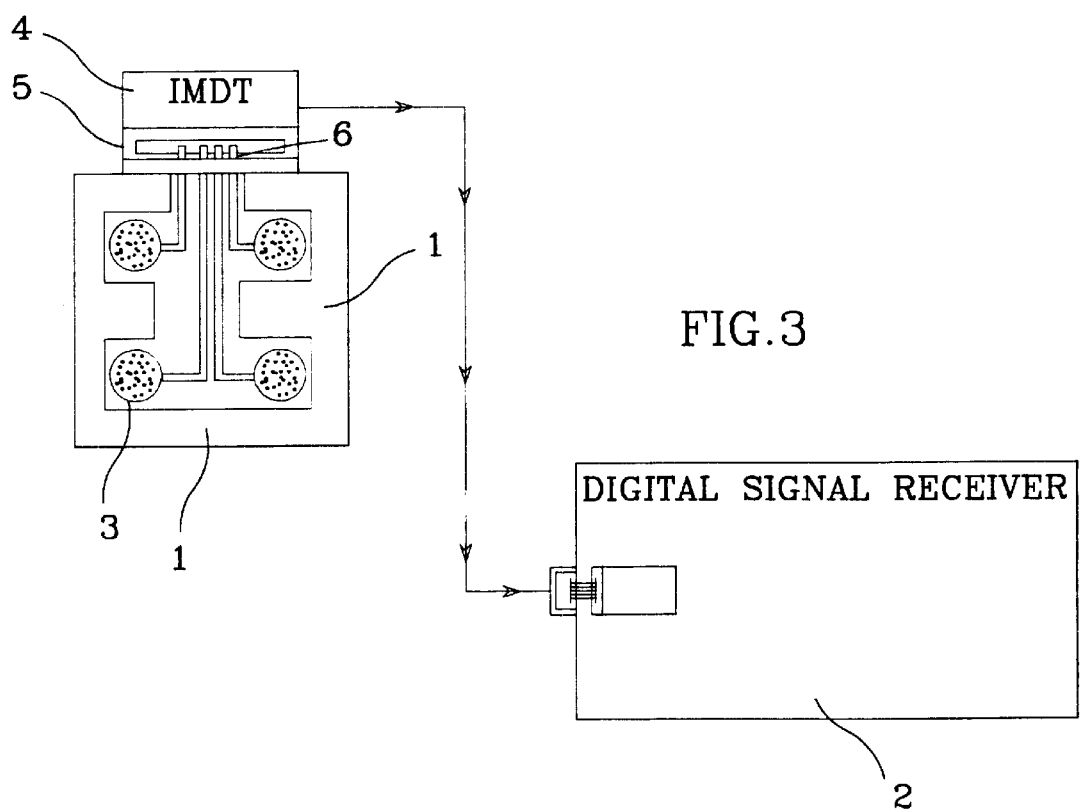
FIG. 3 is an illustrative prospective view of a typical mold and associated control device utilizing a system incorporating the present invention.

As is illustrated in FIG. 1, the system of the prior art provides for an injection molding system I to have a number of wires 2 running from the mold I to the mold controller 3. These wires carry analog information from the mold to the controller and commands or switched electrical power from the controller to the controlled elements associated with the mold. The mold controller must be located away from the mold due to its physical size and due to the environment in which a mold operates, namely an environment in which the mechanical operation of the mold/machine requires it to be suitably secure from any human contact during operations associated with typical injection molding processes. The controlled elements associated with the mold can be mold heaters arranged to heat the mold or the material injected therein (i.e., thermal elements), or valve pistons or the like arranged to create positive opening and closing of the gate within the mold for use in the injection molding process as known to those skilled in the art (i.e., valve gates) and mold/material pressure sensing devices known as cavity pressure sensors.

As is illustrated in FIGS. 3–6, the system of the present invention includes: 1) a mold 1; and 2) a mold controller for receiving and processing information received from the mold as well as for generating control signals for transmission to one or more controlled elements associated with the mold. Sensors 3 are placed at desired locations on, in or around the mold. Such sensors can be directed to sensing information about the temperature, the pressure, the flow or any other variable which the operator wishes to monitor or measure. A temperature sensor input device typically consists of a bi-metallic thermocouple of the type known in the art which generates an analog signal from which a temperature can be determined. Similar sensor elements relating to pressure, set point, power output, and other variables are known to those skilled in the art.

In the preferred embodiment of the present invention, the thermally isolated enclosure 4 is coupled 5 to the mold by means of a junction box 7. Fastening elements 8 and 9 are provided on the enclosure 4 and junction box 9, respectively. The thermally isolated enclosure can be constructed from a plastic or metallic material with a thermally nontransmissive material attached between the enclosure and the mold itself.

Arranged within the thermal enclosure are an internal junction box 6 which houses the interface connections between the mold sensors and the thermal enclosure 4. The thermal enclosure houses electrical and electronic components that include, a signal processor, a transmitter and a power supply. The junction box is arranged to provide a place to simply connect the wires from the mold sensor devices to the device. The junction box is detachable from the thermal enclosure to facilitate quick replacement of faulty components.

Figure 2:
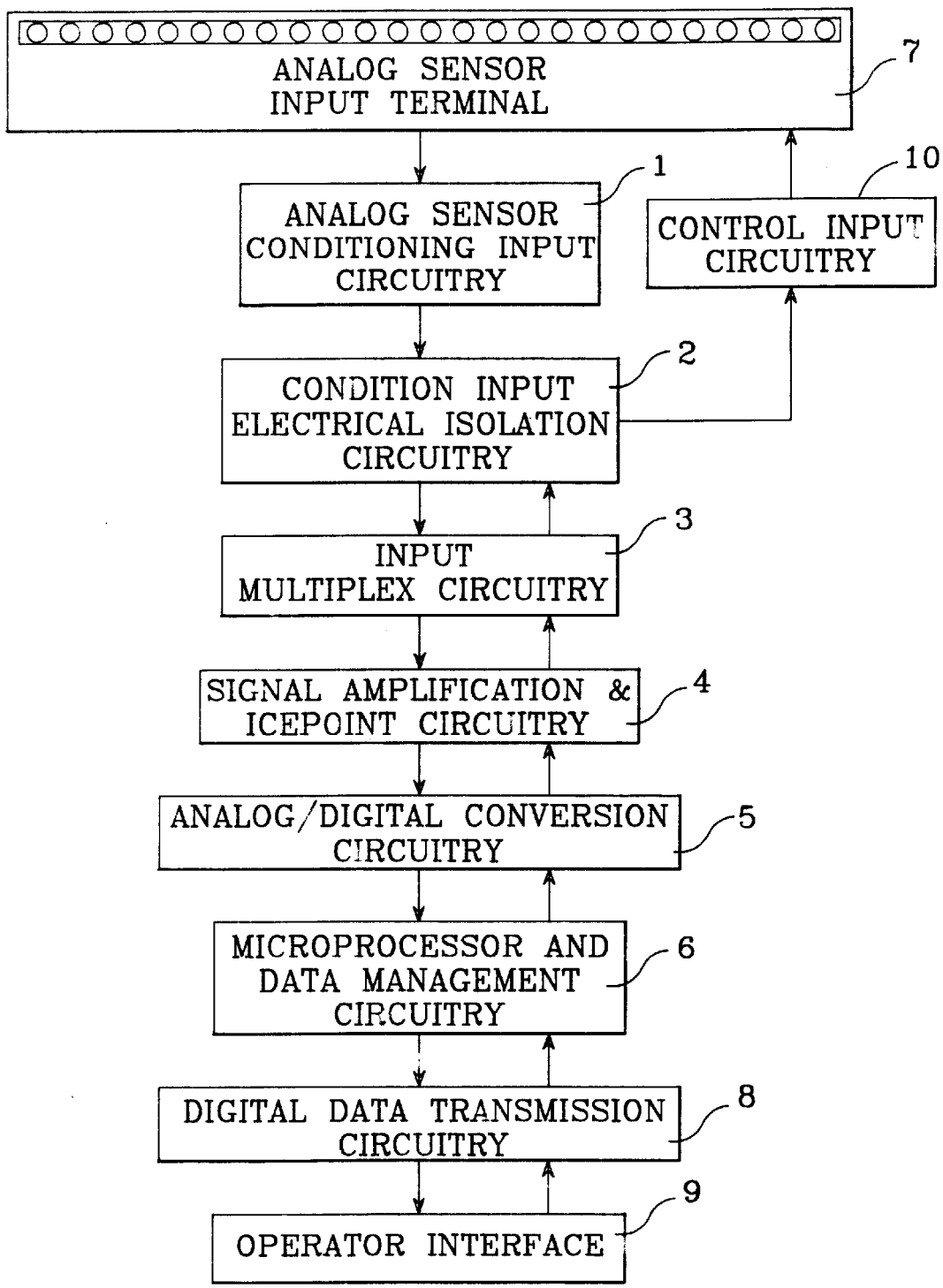
FIG. 2 is a schematic block diagram of the preferred embodiment of the system of the present invention.
Figure 4:
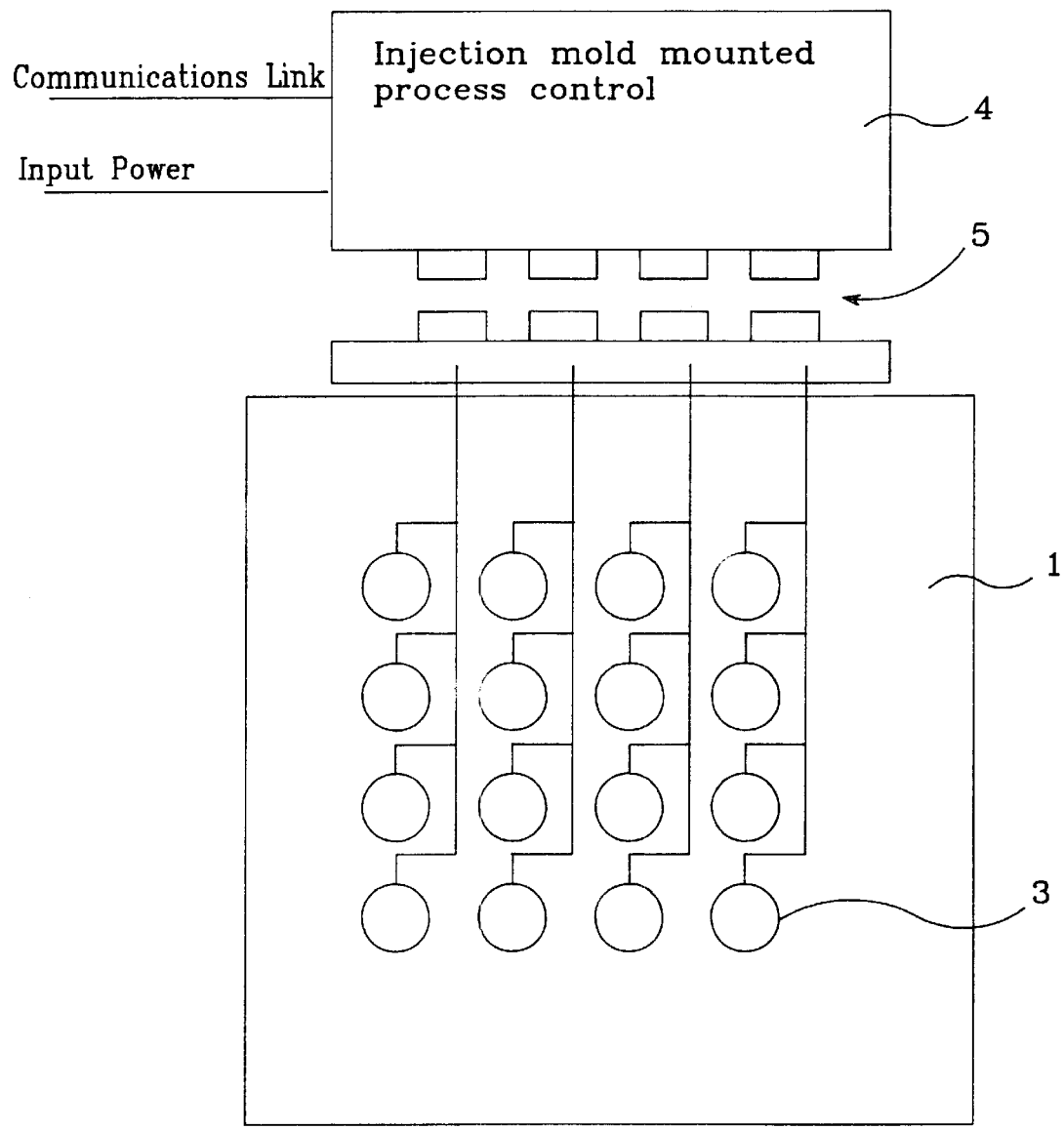
FIG. 4 is a schematic illustration of the subject invention.

As illustrated in FIG. 2, the signal processor of the preferred embodiment includes a sensor conditioning input circuit, an isolation circuit 1, a multiplexer 3, an amplifier 4, a microprocessor 6, and an analog to digital converter 5 as well as the closed loop return logic from the control device. The sensor conditioning input circuit I is connected to the IMDT input devices 7, and serves to amplify the signals and filter noise from the analog inputs. The isolation circuit 2 is connected between the micro-processor 6 and the analog digital converter 5, the isolation circuit acts to optically isolate the signal conditioning and conversion circuitry from the logic of the micro-processor. A multiplexer 3 is coupled to said analog digital circuitry 5 and conditioned inputs. The resulting signals output from said multiplexer, are transmitted to an analog to digital converter 5 of a conventional design. The resulting digital signal is transmitted to a microprocessor 6 via optically isolated circuits for further signal processing within the micro-processor. The input of the transmitter 8 is coupled to said microprocessor 6 for transmission to the receiver connected to the mold controller. The mold controller or operator interface includes an microprocessor and data management circuitry and processes the received signals. The controller 9 then sends control signals, as determined by the microprocessor, to the enclosure where the data transmission process is reversed and processed through central input circuitry 10 to the control input devices. While described in reference to the above identified components, the present invention can be used with other and different configurations which will be known to those skilled in the art. Thus, the present invention is limited only by the claims set forth below.

Figure 5:
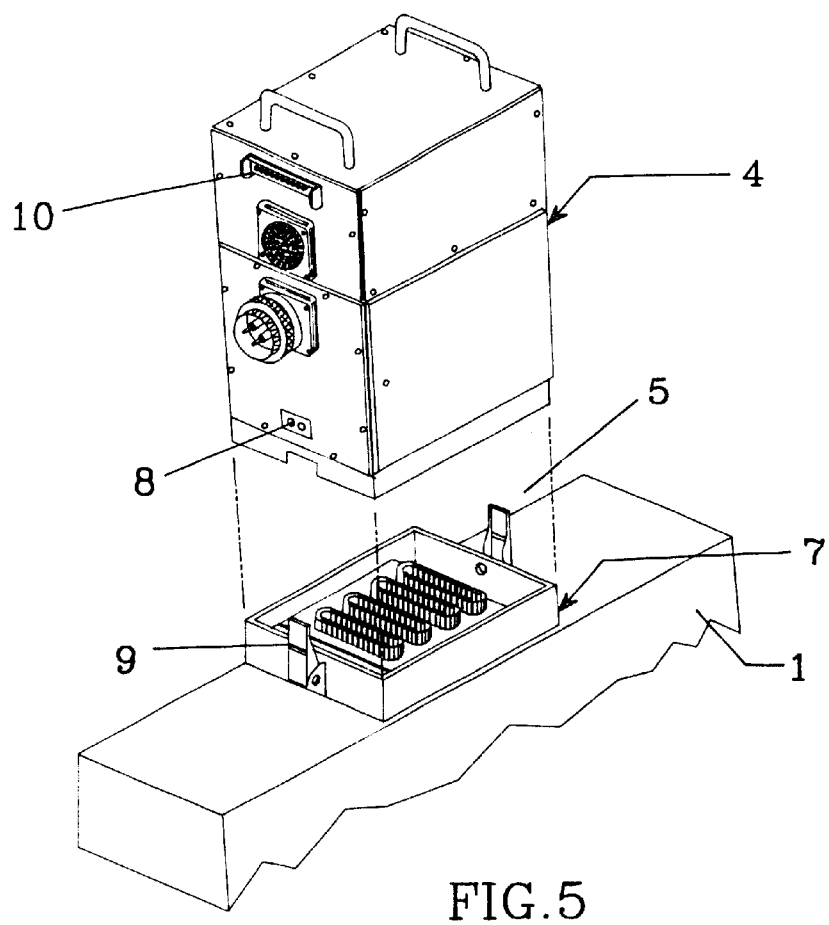
FIG. 5 is a perspective view showing the alignment of the subject invention with the mold.
Figure 6:
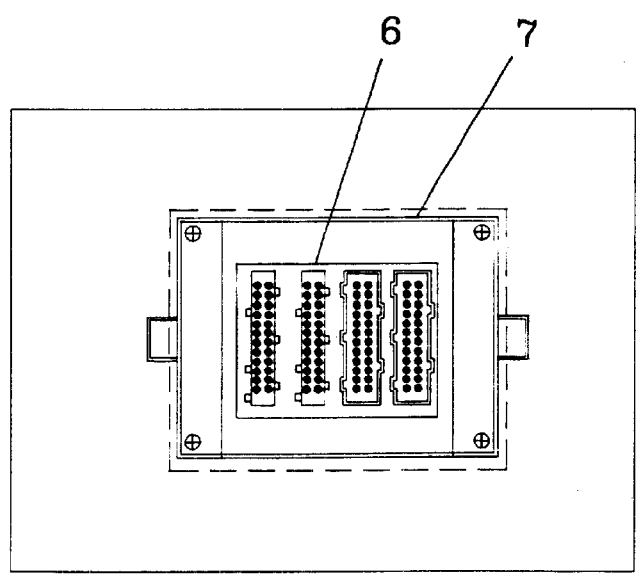
FIG. 6 is a view of the connection assembly of the present invention.

In an alternate embodiment of the invention an additional communications port 10, is shown in FIG. 5 may be provided to allow the subject invention to be connected to other devices. Additionally, cooling means such as a fan, and its accompanying control circuitry, or a water or liquid cooling system may be provided with the inclosure 4. The cooling systems maintain the electrical components within a desired temperature when it is necessary or desirable for the mold operator to heat the mold.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. An injection mold mounted process control and data acquisition apparatus comprising:
   an injection mold;
   a process control and data acquisition system mounted on said injection mold; and
   at least one injection mold-located sensor providing information from said injection mold to the mold mounted process control and data acquisition system; said mold mounted process control and data acquisition system comprising:
   at least one sensor input circuit;
   at least one control output circuit;
   at least one switched power device;
   at least one microprocessor or logic device necessary for control of a process;
   at least one analog-digital signal converter for converting analog sensor signals located within the injection mold to digital signals;
   at least one multiplexing device to deliver an analog signal to an input device within the mold mounted process control and data acquisition apparatus;
   at least one data transmission device to send and receive data in analog or digital format to an attached or remote communicating device;
   at least one memory device located within the mold mounted process control and data acquisition apparatus to store data for use in or in conjunction with control processes, control algorithms, or data storage; and
   a cooling system located within the process control and data acquisition system comprised of an electronic circuit with a cooling medium to remove heat from the process control and data acquisition system using water or air.

2. An injection mold mounted process control and data acquisition apparatus as set forth in claim 1, wherein said process control and data acquisition system is attached to the injection mold in a mechanical fashion with or without a mold junction box, where analog or digital devices and analog or digitally controlled devices terminate from within the injection mold.

3. An injection mold mounted process control and data acquisition apparatus as set forth in claim 1, wherein said apparatus includes a housing which encases the analog or digital sensor input circuits and output circuits of said process control and data acquisition system, protecting them from damage from elements or installing personnel.

4. An injection mold mounted process control and data acquisition apparatus as set forth in claim 1, wherein said injection mold is installable into and removable from said apparatus and said apparatus includes a means of connecting to and disconnecting from the injection mold for assistance in the installation of the mold into or out of the apparatus.

5. An injection mold mounted process control and data acquisition apparatus as set forth in claim 1, wherein said apparatus includes no analog and or digital control signal transfer cables between the injection mold and a remote located process control and data acquisition apparatus.

6. An injection mold mounted process control and data acquisition apparatus as set forth in claim 1, wherein said apparatus includes no process control output cables normally found between the injection mold and a remotely located control device.

7. An injection mold mounted process control and data acquisition apparatus as set forth in claim 1, wherein said process control and data acquisition system includes a control circuit which delivers an output which controls a process control device located on or within said injection mold.

8. An injection mold mounted process control and data acquisition apparatus as set forth in claim 1, wherein said process control and data acquisition system is placed within a housing and includes a cooling circuit to remove excess heat generated by an analog and or digital components within the housing to increase a reliability of the components by keeping their temperature to a minimum.

9. An injection mold-mounted process control and data acquisition apparatus, comprising:
   an injection mold having associated controllable parameters;
   at least one controlled element mounted on said injection mold which varies a respective one of said controllable parameters in response to a control signal;
   at least one injection mold-located sensor which produces an output that varies with a respective one of said controllable parameters;
   a thermally-isolated enclosure mounted to said injection mold; and
   processing circuitry positioned within said thermally-isolated enclosure, said circuitry coupled to said at least one injection mold-located sensor output and said at least one controlled element and arranged to provide at least one of said control signals.

10. The apparatus of claim 9, wherein said controlled elements, said sensors, and said processing circuitry are arranged to provide closed-loop control of at least one of said controllable parameters.

11. The apparatus of claim 9, wherein said processing circuitry comprises:
    an analog-to-digital converter (ADC) which converts said at least one injection mold-located sensor output to a digital signal; and
    a microprocessor which receives said digital signal and is arranged to provide at least one of said control signals.

12. The apparatus of claim 11, wherein said at least one controlled element comprises a plurality of controlled elements and said at least one injection mold-located sensor comprises a plurality of injection mold-located sensors, said processing circuitry further comprising a multiplexer which selectively connects one of said sensor outputs to said ADC, said microprocessor arranged to produce a plurality of said control signals to respective ones of said controlled elements.

13. The apparatus of claim 9, further comprising at least one connector mounted to said thermally-isolated enclosure and an equal number of mating connectors mounted to said injection mold such that said at least one connector and said mating connectors are mated together and couple said processing circuitry to said sensor outputs and said controlled elements when said thermally-isolated enclosure is mounted to said injection mold.

14. An injection mold-mounted process control and data acquisition apparatus, comprising:
    an injection mold having associated controllable parameters;
    at least one controlled element mounted on said injection mold which varies a respective one of said controllable parameters in response to a control signal;
    at least one injection mold-located sensor which produces an output that varies with a respective one of said controllable parameters;

a thermally-isolated enclosure mounted to said injection mold;

processing circuitry positioned within said thermally-isolated enclosure; and at least one connector mounted to said thermally-isolated enclosure and an equal number of mating connectors mounted to said injection mold such that said at least one connector and said mating connectors are mated together and couple said processing circuitry to said sensor outputs and said controlled elements when said thermally-isolated enclosure is mounted to said injection mold;

said controlled elements, said sensors, and said processing circuitry arranged to provide closed-loop control of at least one of said controllable parameters.

15. An injection mold-mounted process control and data acquisition apparatus, comprising:

an injection mold having a plurality of associated controllable parameters;

a plurality of controlled elements mounted on said injection mold which vary respective ones of said controllable parameters in response to respective control signals;

a plurality of injection mold-located sensors which produces respective outputs that vary with respective ones of said controllable parameters;

a thermally-isolated enclosure mounted to said injection mold;

processing circuitry positioned within said thermally-isolated enclosure; and at least one connector mounted to said thermally-isolated enclosure and an equal number of mating connectors mounted to said injection mold such that said at least one connector and said mating connectors are mated together and couple said processing circuitry to said sensor outputs and said controlled elements when said thermally-isolated enclosure is mounted to said injection mold;

said controlled elements, said sensors, and said processing circuitry arranged to provide closed-loop control of at least one of said controllable parameters.

* * * * *